Oct. 17, 1961 H. C. GOODRICH 3,005,048

SIGNAL AMPLITUDE DISCRIMINATORY CIRCUIT

Filed Oct. 29, 1957

INVENTOR.
HUNTER C. GOODRICH
BY
ATTORNEY

United States Patent Office 3,005,048

Patented Oct. 17, 1961

3,005,048

SIGNAL AMPLITUDE DISCRIMINATORY CIRCUIT

Hunter C. Goodrich, Collingswood, N.J., assignor to Radio Corporation of America, a corporation of Delaware Filed Oct. 29, 1957, Ser. No. 693,192
4 Claims. (Cl. 178—7.3)

Figures 1, 2:
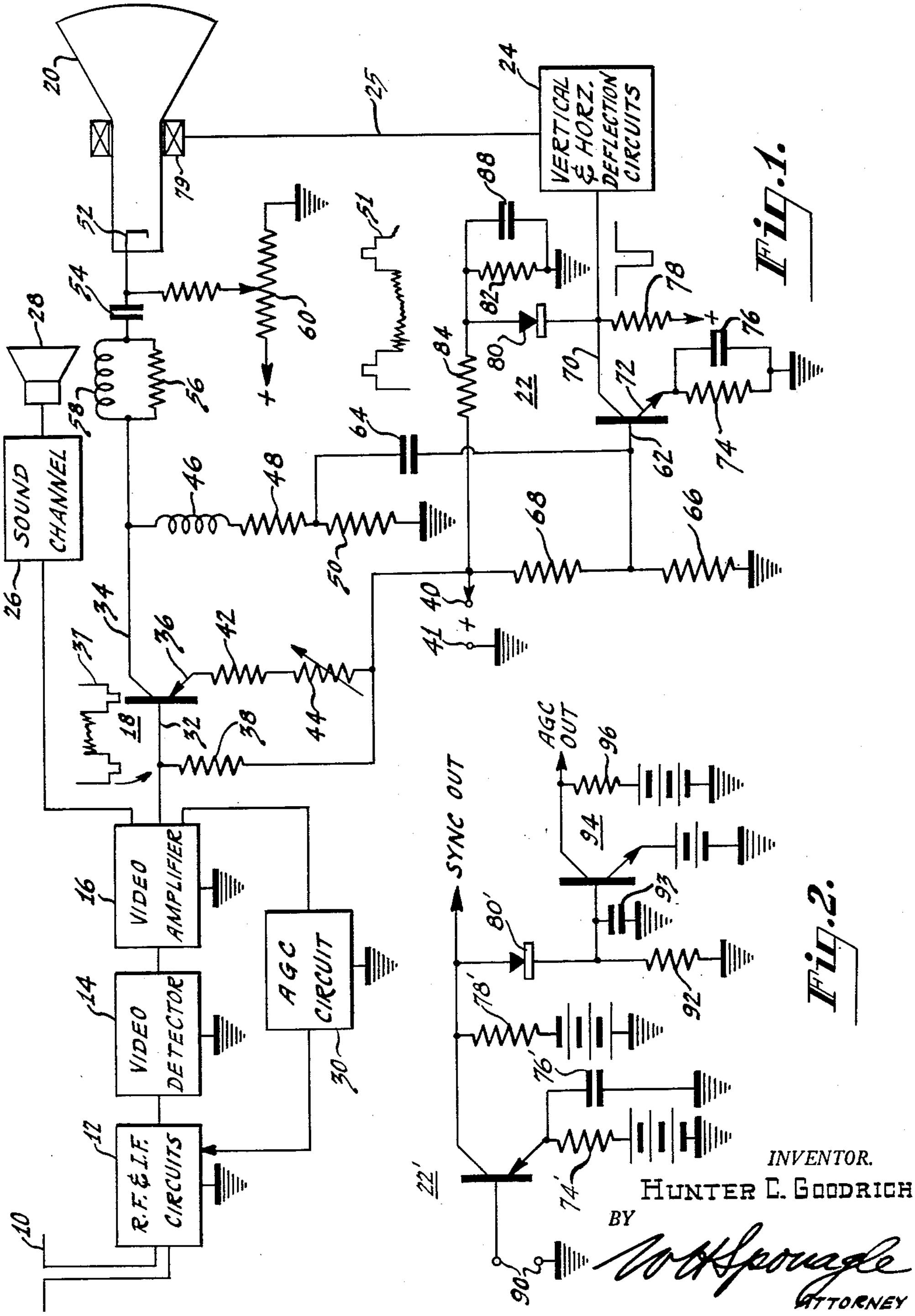

This invention relates to signal amplitude discriminatory circuits, and in particular to transistor circuits that may be utilized for separating synchronizing signal information from composite television signals and the like.

Electrical circuits may require means for separating a predetermined range of signal information from a given alternating current signal. The predetermined range may be separated by clipping that portion of the signal that is below a predetermined minimum threshold and by limiting the maximum level of signal that may be translated. The two functions of clipping and limiting are usually performed by separate vacuum tubes in commercial signal translating circuits such as television receivers. However, the sharp cut-off and saturation characteristics of transistors make possible the use of a one stage separator, in which the same stage both limits and clips the sync pulses.

An important factor in a transistorized sync separator is the maintenance of the proper separation bias level. Even with a good AGC system, the video level applied to the separator will change considerably with changes in line voltage, AGC setting, and the extreme range in signal levels which may be encountered. Since the level at which the separator begins to clip must change with signal level, a self adjusting rather than a fixed bias is required.

The self adjusting cut-off bias for a single stage transistor sync separator is ordinarily provided by a suitable resistor capacitor network in the emitter circuit of the transistor. During the period when the transistor is saturated, the collector current is substantially independent of the signal level and therefore there is no automatic bias adjustment due to collector current. It has been heretofore proposed that the bias adjustments come from the base current. Since the base current is due to the rectification of the signal applied thereto, the benefit of the current gain of the transistor in producing the self bias is not attained. Furthermore, in order to provide the necessary current to develop the required bias, a relatively large amount of power from a low impedance video source is required.

It is accordingly an object of this invention to provide an improved transistor signal amplitude discriminatory circuit for translating only a predetermined amplitude range of an applied signal, and in which the levels of the predetermined range are automatically controllable to accommodate signals of varying amplitude.

It is another object of this invention to provide an improved single stage self-biased transistor synchonizing signal separator circuit for television receivers which may be driven from a low level high impedance signal source.

It is a further object of the invention to provide an improved self-biased circuit utilizing transistor operable between cut-off and saturation for separating the synchronizing signal information from a composite television signal wherein the bias is automatically adjusted as a function of the total collector current of the transistor.

These and other objects and advantages of the invention are achieved, in general, by providing a transistor signal translating circuit including biasing impedance means operable to produce a bias in response to collector current which clips or prevents translation of input signals below a minimum threshold level. A unilaterally conductive device is connected in shunt with the load impedance element for the transistor signal translating circuit to prevent collector saturation. With the unilaterally conductive device, the collector current will increase in response to an increase in signal level thereby permitting the bias voltage developed by the biasing impedance means to vary as a function of signal level. A feature of the invention is that the unilateral conductive device operates to limit the output signal due to input signals above a predetermined maximum value.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings wherein:

FIGURE 1 is a schematic circuit diagram of a television receiver having a signal amplitude discriminatory circuit embodying the invention for separating the recurrent synchronizing signal components from a composite video signal; and FIGURE 2 is a schematic circuit diagram of a synchronizing signal separator embodying the invention with provisions for developing an AGC voltage.

Referring now to the drawing, signals intercepted by an antenna 10 are applied to the television receiver radio frequency (R.F.) and intermediate frequency (I.F.) circuits 12 which may include the usual tuning means, radio frequency amplifier, mixer, oscillator, and intermediate frequency amplifier. The received R.F. signal may be amplified in an R.F. amplifier and is heterodyned with a local oscillator signal in a suitable mixer stage to provide a corresponding signal of intermediate frequency. After amplification, the I.F. signal is applied to a video detector 14 where the intermediate frequency signal is detected before being supplied to a video signal amplifier 16. The output signal from the video amplifier 16 is applied to a video output amplifier 18 for further amplification before application to the input electrodes of a kinescope 20. Signals for a sync separation circuit 22 which controls the vertical and horizontal deflection circuits 24 are also supplied by the video output amplifier 18 as will be more fully explained hereinafter.

As is known, the amplitude modulated video and frequency modulated sound carriers of transmitted television signals are separated by 4.5 megacycles, in accordance with present practice. This separation remains when the received television signal is heterodyned by a mixer to an intermediate frequency signal. The video detector 14 detects the amplitude modulated video signal and at the same time heterodynes the amplitude modulated video carrier and the frequency modulated sound carrier to produce a frequency modulated sound intercarrier having a center frequency of 4.5 megacycles. The sound intercarrier is translated through the video amplifier 16 and applied to the sound channel 26 of the television receiver where it is amplified, demodulated, and applied to a sound reproducing loud-speaker 28.

An automatic gain control circuit 30 which may be of any type is supplied with the detected video signal from the video amplifier 16. The automatic gain control circuit 30 develops a direct voltage proportional to the strength of the video signal to control the gain of selected portions of the R.F. and I.F. circuits 12 of the television receiver.

The video output amplifier 18 comprises a PNP type transistor having a base 32, a collector 34 and an emitter 36. It is understood that NPN type transistors may be used by suitable rearrangement of the circuitry including the operating potentials applied to the various electrodes without departing from the scope of the invention. The composite video signal from the video amplifier 16 is applied to the base 32 in a manner that the synchronizing signal pulses extend in a negative direction as shown in the waveform 37. The video signal from the amplifier 16 may be developed across input circuit means for the video output amplifier 18 comprising a resistor 38 connected between the base 32 and a terminal 40 which may be the positive terminal of a suitable operating potential supply means. The negative terminal 41 of the operating potential supply means is grounded as indicated. The emitter 36 of the video output transistor is also connected to the terminal 40 through a fixed resistor 42 and a variable resistor 44 which may provide a contrast control for a television receiver.

An amplified replica of the video signal is developed across a collector load impedance for the video output transistor including a peaking coil 46 and two serially connected resistors 48 and 50. This signal is reversed 180° in phase from the input signal 37 so that the synchronizing pulse excursions extend in the positive direction as indicated by the waveform 51. This signal is applied to the cathode 52 of the kinescope 20 through a series circuit comprising a coupling capacitor 54 and the parallel combination of an inductor 58 and resistor 56. The proper operating bias potential for the cathode 52 is provided by adjusting the tap on a variable resistor 60 which is connected between ground and the positive terminal of a suitable potential supply means.

The portion of the video signals developed across the video output amplifier load resistor 50 is applied to the base 62 of the sync separator transistor 22 through a coupling capacitor 64. The proper bias potential for the base 62 is provided by a connection to the junction of a pair of serially connected resistors 66 and 68 which form a voltage divider network connected between ground and the terminal 40 of the operating potential supply means.

The sync separator transistor which is shown by way of example as a junction type NPN transistor also includes a collector 70 and an emitter 72. The parallel combination of a resistor 74 and a capacitor 76 is connected between the emitter 72 and ground to form a biasing network which is adapted to develop a potential thereacross in response to the emitter current which maintains the sync separator transistor cut-off for signals having an amplitude less than that of the synchronizing signal component. A load resistor 78 connects the collector 70 of the sync separator transistor to a positive terminal of an operating potential supply means which may, if desired, be the positive terminal 40. The separated horizontal and vertical synchronizing signals which are developed across the resistor 78 are applied to the vertical and horizontal deflection circuits 24 to control these circuits to produce scanning waves which are in synchronism with that of the transmitted signal. The horizontal and vertical scanning waves are applied through a suitable cable 25 to a deflection yoke 79 positioned on the neck of the kinescope 20.

If the sync separator is to be operated from cut-off to saturation to respectively clip and limit the sync signals, the variable component of the bias developed across the emitter biasing network to maintain the proper transistor cut-off level in response to changes in signal amplitude must come from the transistor base circuit. This is because in saturation, the transistor collector current does not change substantially as the forward biasing current in the base is increased, and accordingly the bias developed as a result of the collector saturation current would be substantially constant.

However, in the circuit of the invention, the impedance through the base of the sync separator transistor is relatively high and the base current variations alone are insufficient to produce the sufficient potential change across the biasing circuit 74—76 needed to maintain the proper transistor cut-off level in response to the changes in the applied signal amplitude.

In accordance with the invention, a unidirectionally conductive device such as a rectifier 80 is provided to prevent collector saturation and thereby permit the collector current to vary as a function of sync amplitude. To this end, the rectifier 80 is connected between the collector 70 and the junction of a pair of resistors 82 and 84 which are connected between ground and the positive terminal 40 of the operating potential supply means. The values of the resistors 82 and 84 are selected so that the potential at the junction thereof is sufficient to maintain the rectifier 80 nonconductive during the interval when the sync separator transistor is cut-off. Thus the potential at the junction of the resistors 82 and 84 should be less positive than the +B potential connected to the load resistor 78. The potential difference between the electrodes of the rectifier 80 in the cut-off condition of the sync separator transistor establishes the amplitude of the sync signal developed across the load resistor 78. Accordingly, the minimum signal amplitude translated by the circuit is determined by the cut-off level of the sync separator transistor whereas the maximum amplitude is determined by the clamping action of the rectifier 80.

In the operation of the amplitude discriminatory circuit of the invention as embodied in the sync separator 22, the composite video signal 51 which is polarized so that the synchronizing signal pulses extend in the positive direction, is applied to the base 62 through the coupling capacitor 64.

During the occurrence of the synchronizing pulses, the emitter to collector current of the sync separator transistor causes a bias to be developed across the biasing network 74 and 76. The values of the circuit components are selected so that a bias of sufficient magnitude is developed to maintain the transistor cut-off except for excursions of the video wave extending above the blanking level. When the collector current through the load resistor 78 increases, the collector 70 potential decreases. The collector 70 is connected to the cathode of the rectifier 80, and when the collector 70 potential drops to a point where the cathode of the rectifier 80 becomes negative with respect to the anode thereof, the rectifier 80 conducts current. This diverts the collector 70 current around the load resistor 78 through a low impedance path including the rectifier 80 and a bypass capacitor 88 thereby enabling the current through the collector 70 to be a function of the applied signal amplitude. Since the collector current is a function of the applied signal amplitude, the bias developed across the network 74—76 will also be a function of the applied signal amplitude.

Since the potential of the collector 70 will not drop substantially below the potential at the junction of the resistors 82 and 84, all signals above this level do not affect the output voltage developed across the load resistor 78. Accordingly, it can be seen that the rectifier 80 performs the dual function of preventing collector saturation to provide a collector current which varies with signal strength, and also serves to limit the maximum amplitude of the sync signals.

Referring now to FIGURE 2, a modification of the invention is illustrated wherein the current flowing through the unidirectionally conductive device is utilized to develop an AGC voltage. The circuit of FIGURE 2 is essentially the same as the sync separator circuit shown in FIGURE 1 except that a PNP type transistor is used, and the operating potential supply means is shown as a battery. The composite video signal is applied to the sync separator 22' by way of the terminals 90. A biasing network comprising a resistor 74' and a capacitor 76' are connected in the emitter circuit of the sync separator transistor, and a load impedance element 78' is connected in the collector circuit. The unidirectionally conductive device represented by the rectifier 80' is connected in series with a resistor 92 having a small resistance value, to prevent collector saturation of the sync separator transistor.

A capacitor 93 is connected in parallel with the resistor 92 to provide a low impedance shunt path for the sync signals. During the interval between the synchronizing signals, the capacitor 93 discharges through the resistor 92 to develop a voltage which will be proportional to the peak amplitude of the applied synchronizing signal. During the synchronizing pulse interval the rectifier 80′ prevents collector saturation by diverting the collector current around the load resistor 78′. The current through the rectifier 80′ is a function of the peak sync amplitude and accordingly the voltage developed across the resistor 92 is also a function of the peak sync amplitude.

An AGC amplifier 94 comprising a NPN type transistor is directly coupled to the resistor 92 to amplify the voltage developed thereacross, and an output signal developed across a resistor 96 will be developed representative of the received signal level. The voltage appearing across the load resistor 96 is then applied to suitable filters, not shown, prior to application to the R.F. and I.F. amplifiers of the television receiver.

What is claimed is:

1. An amplitude discriminatory signal circuit for translating a predetermined range of signal information from an applied signal comprising, a semi-conductor device having base, emitter and collector electrodes, means for applying an input signal between said base and emitter electrodes of said device, biasing circuit means connected between said base and emitter electrodes to be traversed by the emitter current of said device and responsive to emitter current of said device to develop a bias potential of a magnitude to render said device non-conductive for the application of applied signals below a predetermined amplitude, a load impedance element and operating potential supply means connected in series between said collector and emitter electrodes, and circuit means including a unidirectionally conductive device connected in parallel with at least a portion of said load impedance element and poled to conduct in response to a predetermined potential variation across said load impedance element to prevent collector current saturation in said device in response to applied signals of increasing amplitude above said predetermined amplitude and to provide variation of said bias potential in response to the amplitude of said applied signal.

2. In a television receiver a synchronizing signal separator stage comprising a signal translating semi-conductor device having base, emitter and collector electrodes, an input circuit connected between said base and emitter electrodes for applying a composite television signal therebetween, said input circuit including a biasing network connected to be traversed by the emitter current of said device and responsive to the emitter current of said device to provide a biasing potential of an amplitude to maintain said transistor cut-off for signals having an amplitude less than that of the blanking level of said composite television signal, means providing an output circuit including a load impedance element and an operating potential supply connected in series with said biasing network between said emitter and collector electrodes, means for preventing collector current saturation of said device including a rectifier having one electrode thereof connected with said collector electrode and poled to be biased in the non-conducting direction by said potential supply and to conduct in response to a predetermined potential drop across said load impedance element, and utilization circuit means connected with said output circuit means.

3. In a television receiver, a synchronizing signal separator stage comprising a signal translating semi-conductor device having base, emitter and collector electrodes, an input circuit connected between said base and emitter electrodes for applying a composite video wave therebetween and including a biasing network responsive to the emitter current of said device to provide a biasing potential of an amplitude to maintain said transistor cut-off for signals having an amplitude less than that of the blanking level of said composite video wave, means providing an output circuit including a load impedance element and an operating potential supply connected in series with said biasing network between said emitter and collector electrodes, a rectifier having one electrode thereof connected with said collector electrode and poled in said circuit to conduct in response to a predetermined potential drop across said load impedance element for preventing collector current saturation of said semi-conductor device and to provide variation of said biasing potential in response to variation in the amplitude of said applied video wave, and means for developing an automatic gain control potential in response to current through said rectifier.

4. In a television receiving system adapted to receive a television signal, a synchronizing signal separator circuit for deriving synchronizing signals in response to said television signal comprising in combination, a transistor including base, emitter, and collector electrodes, input circuit means for applying said television signal to said base electrode, said television signal having a polarity such that the synchronizing signals cause a greater emitter-to-collector current flow through said transistor than the remaining portions of said television signal, means including a biasing circuit connected between said emitter electrode and a point of reference potential in said system for developing a reverse bias voltage in response to emitter current of said transistor to render said transistor substantially non-conductive for received television signals below a predetermined amplitude, means providing an increase in collector current of said transistor in response to the application of television signals of increasing amplitude above said predetermined amplitude and variation of said bias voltage in accordance with variation in amplitude of said applied television signal, said last named means including a diode connected between said collector and said point of reference potential and poled to be normally non-conducting and to conduct in response to predetermined collector current flow of said transistor, and output circuit means connected for deriving a separated synchronizing signal from between said collector and emitter electrodes.

References Cited in the file of this patent

UNITED STATES PATENTS

| | | |
|---|---|---|
| 2,673,892 | Richman | Mar. 30, 1954 |
| 2,864,888 | Goodrich | Dec. 16, 1958 |
| 2,872,594 | Logue | Feb. 3, 1959 |
| 2,884,544 | Warnock | Apr. 28, 1959 |
| 2,906,817 | Kidd | Sept. 29, 1959 |

OTHER REFERENCES

Application Notes on the Philco Surface Barrier Transistor (Philco Corporation, Lansdale Tube Company Division, Lansdale, Pennsylvania) (Indication of date back cover—Form No. LTC-287 5-56) May 1956, page 8.